July 10, 1956  P. HOCHHAUSLER  2,754,462
ELECTRIC MOTOR REVERSING SYSTEM
Filed July 30, 1953

INVENTOR.
Paul Hochhausler
BY
Merchant & Merchant
ATTORNEYS

United States Patent Office 2,754,462
Patented July 10, 1956

2,754,462
ELECTRIC MOTOR REVERSING SYSTEM

Paul Hochhausler, Honnef (Rhine), Germany, assignor to Wilhelm Lepper, Honnef (Rhine), Germany Application July 30, 1953, Serial No. 371,265

Claims priority, application Germany September 24, 1952

5 Claims. (Cl. 318—245)

The present invention relates to an electric control system, especially to a distance control system, by which the device to be controlled is capable of being energized in two opposite directions, whereby the ratio of energization in the one direction to that in the other direction may be chosen and changed during operation.

One object of the present invention is to provide a control system by which the direction of energization may not only be reversed but changed from the highest value in one direction through zero to the highest value in the other direction gradually or stepless without making use of any switches or relays.

A further object of the invention is to make use in such a control system of different kinds of current, e. g. current of different frequencies or A. C. and D. C.

Still a further object of the invention consists therein that the consumer is an electro-magnetic device, e. g. an electro-motor having two field-windings arranged in such a manner that they may be excited in opposite directions, the one winding being a main current winding and the second winding being a shunt winding, means being provided such as impedances to let the one kind of current pass only through the one and the other kind of current only through the other winding.

Still a further object of the invention consists in providing a system for controlling a pattern railway, the control circuit being the same as the power supply circuit and the control currents being identical with the power or driving currents.

Further objects and advantages of the present invention will become clear from the following description when compared with the accompanied sheet of drawings, in which.

Figure 1:
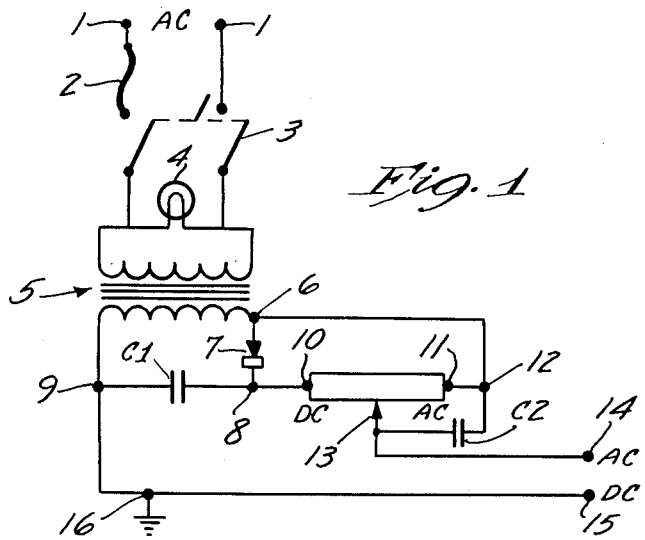
Fig. 1 shows by way of example a wiring diagram of the main connections set showing the two sources of current and the main controller.

Referring now to Fig. 1, the numeral 1 indicates the terminals by which the set is connected to the net-work supplying A. C. A fuse is indicated at 2 and a main disconnecting switch at 3. 4 is a glow bulb or other indicating lamp. The main transformer is indicated 5, the one secondary terminal 9 of which is grounded at 16, and the other terminal 6 is connected to a rectifier 7 and to a terminal 11 of a voltage divider. Through the rectifier 7 a connection is made to the other terminal 10 of this voltage divider. There also may be inserted between terminals 8 and 9 a condenser C1 to smooth the D. C. Between terminal 12 and the sliding contact 13 of the voltage divider there may be inserted a second condenser C2 which facilitates the adjustment of the A. C. component. Between terminals 6 and 12 there also may be provided a third condenser to prevent pre-magnetization of the transformer by D. C., especially in the case when a two-way rectifier is used instead of the one-way rectifier shown in Fig. 1. The output terminals 14 and 15 of the main connections set supply to a consumer a mixture of A. C. and D. C., the share of A. C. and D. C. in said mixture being determined by the position of the sliding contact of the voltage divider. But it may be noted that the effective voltages of A. C. and D. C. are to be the same with the result that on moving the sliding contact 13 the effective voltage at terminals 14, 15 remains constant, only the share of A. C. and D. C. is variable depending on the position of the sliding contact 13. If the sliding contact is moved to the utmost right position at terminal 11, only A. C. is fed to terminal 14. If the sliding contact 13 is moved to the utmost left position at terminal 11, the terminal 14 is supplied with pure D. C. In intermediate positions, the shares of A. C. and D. C. vary with the movement of the sliding contact; and in or near the middle-position the ratio between A. C. and D. C. is 1 and as much A. C. is fed to terminal 14 as D. C.

Figure 2:
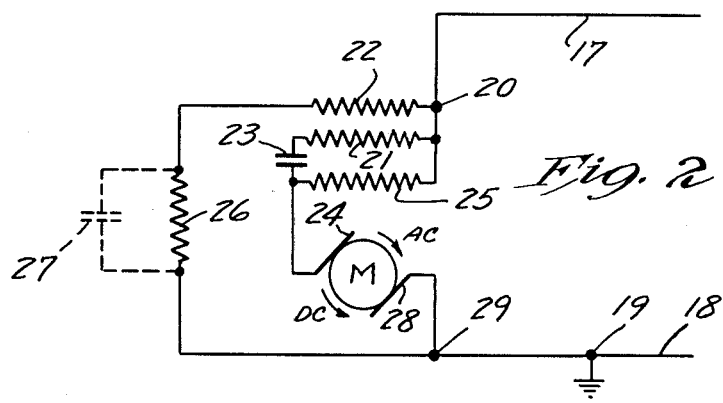
Fig. 2 shows a connection scheme for the consumer shown in form of an electro-motor.

In Fig. 2 there is shown a wiring scheme for the consumer shown in form of an electro-motor. The supply line is indicated 17 and the ground line or return conductor 18, which may be led to ground or zero at 19. From derivation point 20 of line 17 there are two ways for the current, one through a shunt winding 22, made up of very fine wire, and a series impedance 26, which may be shunted by a condenser 27 for resonance, to point 29 of the return line 18; also from the derivation point 20 current may flow through the main current winding 21 and in parallel through the impedance 25 to the collector brush 24 of an electro-motor. The other collector brush 28 is connected to point 29. There also is provided a condenser 23 of high capacity in series with the main current winding 21 to prevent any flow of D. C. through said main current winding.

Assuming that line 17 supplies pure A. C., the series connection of the shunt winding 22 and impedance 26 is calculated to have a relatively high resistance to the flow of current, the main part of which will flow through the main current winding 21 which has a relatively low impedance to A. C. current, thereby exciting the magnetic field of the electro-motor in one direction; the motor turning in a direction indicated by the arrow right above the collector. There will also be some A. C. current flow through impedance 25, in parallel to main current winding 21, through brushes 24 and 28 to ground.

If there is supplied pure D. C. by line 17, the current is divided into two branches at point 20 and flows through the shunt winding 22, the impedance 26 to point 29, and through impedance 25 and brushes 24 and 28 to point 29. The circuit through main current winding 21 is adapted to have a relatively high impedance to D. C. current in comparison to the shunt impedance 25; and preferably as shown, condenser 23 is inserted to block all D. C. current flow through the winding 21. Thereby a magnetic field is built up only by the shunt winding 22, which is wound to rotate the motor in the opposite direction than actuated by the A. C. current through main current winding 21, indicated by the arrow beneath the collector.

If there is supplied a mixture of A. C. and D. C. by line 17, each acts in effect to excite rotation of the motor in opposite directions. Thus, it is as though each component of current, A. C. and D. C., through the brushes 24 and 28 acts in relation to the magnetic field associated therewith, built up by the windings 21 and 22, to excite rotation of the motor in opposite directions. In the case where the two excitations compensate each other exactly, the motor doesn't rotate at all. In all other cases where one of the kinds of current prevails a faster or slower rotation in one or the other direction occurs. If the electro-magnetic device isn't an electro-motor but an electro-magnetic rotating switch or, what means the same, if the rotor of the electro-motor is limited in its rotation, say by springs, and provided with a contact arm adapted to slide over several contacts the device may be used as a distance control switch for any purpose.

Figure 3:
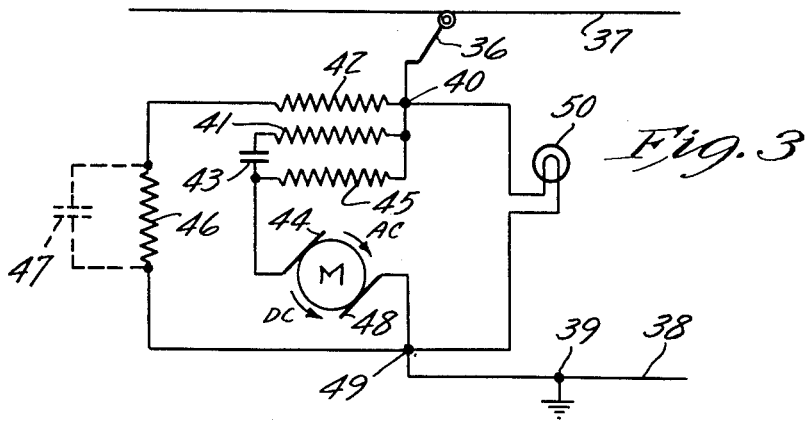
Fig. 3 shows a connection scheme similar to Fig. 2 for the motor and light bulbs of a pattern railway.

In Fig. 3 there is shown a wiring diagram for a pattern railway, 37 being the supply line, 36 the trolley brush, 38 the return line—preferably the rails that are earthed or grounded at 39, 40 is a derivation point; 41 the main current winding and 42 the shunt current winding. Condenser 43 is in series with main current winding 41 to block the D. C. current flow therethrough. Numeral 45 is the impedance lying in parallel to the main current winding 41, 46 being the impedance connected in series to the shunt winding 42. Condenser 47 may be provided but is not essential for the function of the device. The numerals 44 and 48 are the collector brushes of the motor of the pattern railway. Numeral 49 is the second derivation point, and a light bulb or bulbs 50 may be inserted between derivation points 40 and 49. In the same manner as in Fig. 2 the motor acts on A. C. as a main current motor, and as a shunt wound motor with D. C. By suitable dimensioning of both field windings 41 and 42, the motor has the same rotating power in both directions of rotation. Since it is an essential feature of the present invention that the effective voltage between derivation points 40 and 49, which is the summation of voltage at output terminals 14 and 15 producing both kinds of current, is constant and identical, the resulting voltage fed to the consumer remains constant in every position of the sliding contact 13 of the main controller. The brightness of bulbs 50 is not affected by the regulation of motor-speed or even reversal of the direction of rotation.

Having now described my invention by way of example it is clear for any person skilled in the art that the application of this invention is not limited to the example shown and described, but may be limited only by the scope of the appended claims.

What I claim is:

1. In an electric control system, a constant source of current comprised of two variable components of different characteristics, each component being variable between a maximum and a minimum value, an electromagnetic motor, and two circuits between said source of current and said electromganetic motor, one of said circuits having a relatively high impedance to one component of said current and a relatively low impedance to the other component of said current and the other circuit having a relatively high impedance to said last-mentioned component of said current and a relatively low impedance to the other component of said current, one of said circuits energizing said electromagnetic motor for rotation in one direction and the other circuit energizing said electromagnetic motor for rotation in the opposite direction, whereby the energization of said electromagnetic motor by said source of current is variable from a maximum value in one direction through the static position of said motor to a maximum value in the opposite direction.

2. The structure defined in claim 1, wherein said constant source of current comprises a source of alternating current, a source of direct current, a voltage divider, and two output terminals, one terminal of said direct current source being connected to one end of said voltage divider and the other terminal being connected to one of said output terminals, one terminal of said alternating current source being connected to the opposite end of said voltage divider and the other terminal being connected to said last-mentioned output terminal, the center arm of said voltage divider extending to the second output terminal, whereby at said output terminals there is a constant effective voltage providing a constant source of current comprised of two variable components of different characteristics.

3. The structure defined in claim 2 in further combination with a lamp circuit between said output terminals in parallel with said electromagnetic motor circuit comprising a light bulb and conductors extending from said bulb to each of said output terminals, whereby said bulb is lighted by its conductive connection to a constant effective voltage unaffected by the speed or direction of rotation of said electromagnetic motor.

4. In an electric control system, a constant source of current extending to two output terminals one of which is ground, said source of current being comprised of two components of different characteristics inversely variable between a maximum and a minimum value; an electromagnetic motor comprising an armature, brushes in contact with said armature, and two field windings; a circuit comprised of two branches extending from the non-grounded terminal of said output to ground, one of said branches extending through one of said windings and the other branch extending through the brushes of said motor to ground, said branch extending through the winding having a relatively high impedance to one of said components of current and a relatively low impedance to the other of said components of current, a second circuit extending from the non-grounded terminal of said output through the other of said windings and extending therefrom through the brushes of said motor to ground, said second circuit having a relatively high impedance to said last-mentioned component of current and a relatively low impedance to the other of said components of current, one of said circuits energizing said electromagnetic motor for rotation in one direction and the other circuit energizing said electromagnetic motor for rotation in the opposite direction, whereby the energization of said electromagnetic motor by said source of current is variable from a maximum value in one direction through the static position of said motor to a maximum value in the opposite direction.

5. The structure defined in claim 4, wherein said constant source of current comprises a constant source of alternating current, a transformer having primary and secondary windings, said source of alternating current being connected to said primary winding, a rectifier, a voltage divider, and two output terminals, one terminal of said secondary winding being conduitively connected to one of said output terminals, the latter being ground, two parallel conductors extending from the other terminal of said secondary winding to opposite ends of said voltage divider, one of said parallel conductors extending to and from said rectifier between said voltage divider and said secondary winding, the center arm of said voltage divider extending to the the second output terminal, and in further combination with a lamp circuit between said output terminals in parallel with said electromagnetic motor circuits comprising a light bulb and conductors extending from said bulb to each of said output terminals, whereby said bulb is lighted by its conductive connection to a constant effective voltage unaffected by the speed or direction of rotation of said electromagnetic motor.

No references cited.